United States Patent [19]
Barényi et al.

[11] 3,795,418
[45] Mar. 5, 1974

[54] BUMPER ARRANGEMENT IN A VEHICLE

[75] Inventors: Béla Barényi, Maichingen; Hermann Renner, Magstadt, both of Germany

[73] Assignee: Daimler-Benz AG, Stuttgart, Germany

[22] Filed: June 2, 1972

[21] Appl. No.: 259,001

[30] Foreign Application Priority Data
June 2, 1971 Germany.............................. 2127258

[52] U.S. Cl......................... 293/88, 293/86, 267/35
[51] Int. Cl............................................. B60r 19/06
[58] Field of Search...... 293/70, 71 R, 71 P, 85, 86, 293/88, 89; 114/219; 267/35, 63 R, 63 A, 139, 140, 141, 153

[56] References Cited
UNITED STATES PATENTS
3,656,792  4/1972   Tavano, Sr............................ 293/88
1,564,488  12/1925  Nastri ................................... 293/86
3,457,729  7/1969   Wanneroy............................ 267/140
3,701,322  10/1972  Carle .................................... 267/35
1,810,717  6/1931   Lord..................................... 293/86

Primary Examiner—Robert J. Spar
Assistant Examiner—Robert Saifer
Attorney, Agent, or Firm—Craig and Antonelli

[57] ABSTRACT

A bumper arrangement in a vehicle, especially in a motor vehicle in which at least two shock absorbers are provided between the bumper and the support structure; the shock absorbers thereby extend in extension of the lateral parts of the support structure at least approximately in the vehicle longitudinal direction and are secured to the bumper and to the support structure by way of joints having vertical axes while they are supported in the vehicle transverse direction between elastic bodies.

31 Claims, 9 Drawing Figures

3,795,418

BUMPER ARRANGEMENT IN A VEHICLE

The present invention relates to an arrangement of a bumper at a vehicle, especially at a motor vehicle, which is yieldingly held at the support structure of the vehicle.

The yielding arrangement of bumpers has the advantage compared to the rigid bumper arrangement that in case of a relatively light collision against an obstacle, neither a damage of the bumper nor of the connecting parts of the support structure or of the lights and the like has to be feared. The known yielding bumper arrangements provide spring elements between the support structure and the bumper. In order that the bumper does not sag down in the vertical direction, additional guide elements have to be used. Additionally, such types of bumper arrangements tend to a considerable extent to oscillate whereby the oscillations are caused by vehicle vibrations, especially by engine vibrations.

The present invention is concerned with the task to provide with structurally simple means an effective bumper arrangement of the aforementioned type in which the occurrence of oscillations and vibrations is far-reachingly prevented. The present invention essentially consists in that at least two shock absorbers extending in prolongation of the lateral parts of the support structure (frame) and approximately in the vehicle longitudinal direction are arranged between the bumper and the support structure which are secured in joints having vertical axes and are supported in the vehicle transverse direction between elastic bodies, especially rubber elements. Such a bumper arrangement entails the advantage that in case of an impact of an obstacle, energy is dissipated due to the telescoping action of the shock absorbers. The bumper is movable only in the horizontal plane which, in practice, is sufficient. Therebeyond, it cannot be excited into oscillations or can be excited only slightly into oscillations whereas the elastic bodies produce in an extraordinarily simple manner the necessary return forces for assuring the normal rest position after inclined forces act on the bumper.

In a simple embodiment of the present invention, the shock absorbers are inserted into apertures or recesses of the support structure, whereby the elastic bodies abut at the walls of these apertures or recesses which widen wedge-shaped in the outward direction toward the respective vehicle end. In another embodiment of the present invention, the elastic bodies are accommodated in housings surrounding the shock absorbers, which are secured at the bumper or at the support structure. This entails the advantage that also these parts are easily interchangeable in case of damage. It is particularly advantageous if one housing each together with the elastic bodies and a shock absorber forms a structural unit detachably secured at the bumper or at the support structure. A particularly simple assembly and simple exchange of the bumper mountings results therefrom.

In a further embodiment of the present invention, provision is made that a support tube surrounding the shock absorber is mounted at the bumper which is guided in the elastic bodies that are secured at the support structure. The advantage is additionally attained in this construction that the elastic bodies possess a return force which stress the shock absorbers in the stretched condition (shear) whereas the shock absorbers are far-reachingly relieved of bending forces also when forces act obliquely on the bumper.

In a structurally advantageous embodiment of the present invention, the housing forms at least a part of a joint for the shock absorber. A considerable simplification of the assembly is made possible thereby.

In a space-saving embodiment of the present invention, the joint connecting the bumper or the support structure with the shock absorber engages approximately centrally at its cylinder which is laterally supported by elastic bodies.

Accordingly, it is an object of the present invention to provide an arrangement of a bumper at a vehicle which avoids by simple means the aforementioned shortcomings and drawbacks encountered in the prior art.

Another object of the present invention resides in an arrangement of a bumper at the fixed support structure of a motor vehicle which at least far-reachingly prevents the occurrence of vibrations and oscillations on the part of the bumper.

A further object of the present invention resides in a bumper arrangement for vehicles in which the support of the bumper is also capable of dissipating energy in case of impact against the bumper.

Still another object of the present invention resides in an arrangement of a bumper at a motor vehicle in which the return forces necessary to return the bumper into its normal position after the occurrence of an impact are produced by extremely simple means.

Still a further object of the present invention resides in a bumper arrangement for vehicles which facilitates the assembly and interchange of damaged parts.

These and further objects, features and advantages of the present invention will become more apparent from the following description when taken in connection with the accompanying drawing which shows, for purposes of illustration only, several embodiments in accordance with the present invention, and wherein.

Figure 1:
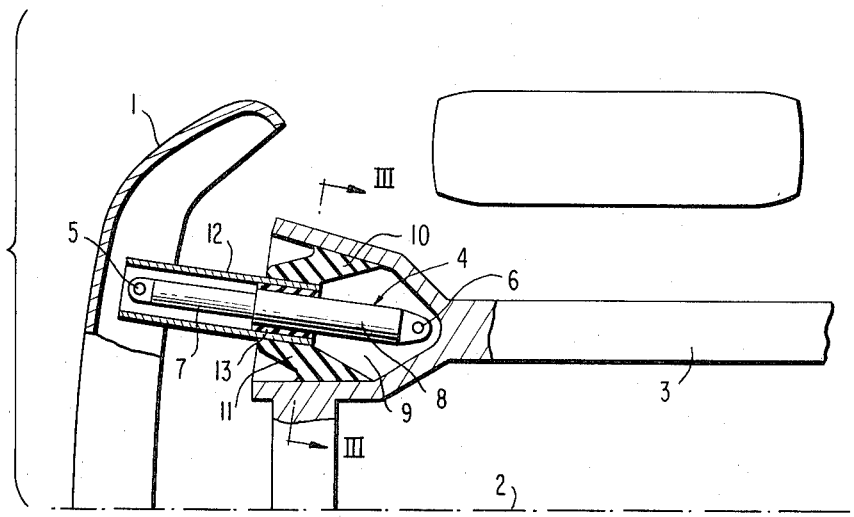
FIG. 1 is a somewhat schematic partial plan view, partially broken away, of a first embodiment of a bumper arrangement in accordance with the present invention.

Referring now to the drawing wherein like reference numerals are used throughout the various views to designate like parts, in all illustrated plan views, only one-half of a bumper 1 is illustrated whose other half is constructed mirror-like symmetrically with respect to the vehicle longitudinal center plane 2 and is connected with the relatively fixed support structure 3 of a vehicle in a corresponding manner. The term "support structure" is used in this application including the claims, to designate the relatively fixed support structure of a vehicle, such as a frame, chassis frame, etc. The bumper 1 which is as rigid and strong as possible is supported by shock absorbers generally designated by reference numeral 4 which are secured by means of joints 5 and 6 at the bumper 1 and at the support structure 3. The shock absorbers 4 which each consist of a piston 7 and of a cylinder 8 are disposed in the extension of the lateral longitudinal bearers of the support structure 3. Their longitudinal axis is slightly inclined toward the outside with respect to the vehicle longitudinal center plane 2. The joints 5 and 6 possess vertical axes so that the bumper 1 is yielding only in the horizontal plane and is held far-reachingly rigid or stiff in the vertical direction. The joint 6 is disposed in the embodiment according to FIGS. 1 and 3 within the area of the bottom of an aperture or recess 9 of the support structure 3 which is open toward the outside, i.e., toward the respective vehicle end. The walls of the recess 3 widen outwardly approximately wedge-shaped so that a sufficient pivot range exists for the shock absorbers 4 in order to be able to yield also in case of obliquely directed forces. Spring elements (not shown) of any conventional construction are provided on the inside of the shock absorbers 4 which retain the unstressed or non-loaded shock absorbers 4 in their normal rest position.

Figure 3:
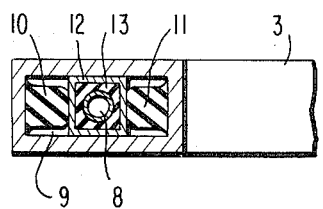
FIG. 3 is a cross-sectional view, taken along line III—III of FIG. 1.

In order to ensure the normal rest position of the bumper arrangement with respect to the transverse direction by corresponding return forces, rubber elements 10 and 11 are arranged laterally of the shock absorbers 4 which are supported at the inner walls of the recesses 9 (FIGS. 1 and 3). The rubber elements 10 and 11 act on the cylinders 8 of the shock absorbers 4 so that the latter are aligned in their rest position.

A support tube 12 with square cross section is additionally provided between the bumper 1 and the support structure 3, which is pivotally secured at the bumper 1 and is inserted into the recess 9 of the support structure 3. The support tube 12 assumes additionally a vertical support of the bumper 1 so that the joints 5 and 6 are far-reachingly relieved. Above all, however, the support tube 12 absorbs the forces occurring in the transverse direction so that also in this direction the pistons 7 are stressed only with slight bending forces. The rubber elements 10 and 11 are supported externally at the portion of the support tube 12 projecting into the recess 9. On the inside of the support tube 12 is provided a rubber ring 13 which surrounds the cylinder 8 of the shock absorber 4 and thus centers the support tube 12 with respect to the cylinder 8. If the rubber elements 10 and 11 are securely fastened both at the walls of the recess 9 as also at the support tube 12 by conventional means, for example, by gluing, bonding or the like, then they also produce return forces acting in the axial direction of the shock absorbers 4 whereby their parallelogram-like configuration is effective in an advantageous manner.

With a sufficient dimension of the rubber elements 10 and 11, it is possible also to dispense with the spring elements provided on the inside of the shock absorbers 4 so that only the rubber elements 10 and 11 produce the return forces holding the bumper arrangement in its normal rest position both in the vehicle transverse direction as also in the vehicle longitudinal direction.

Figure 2:
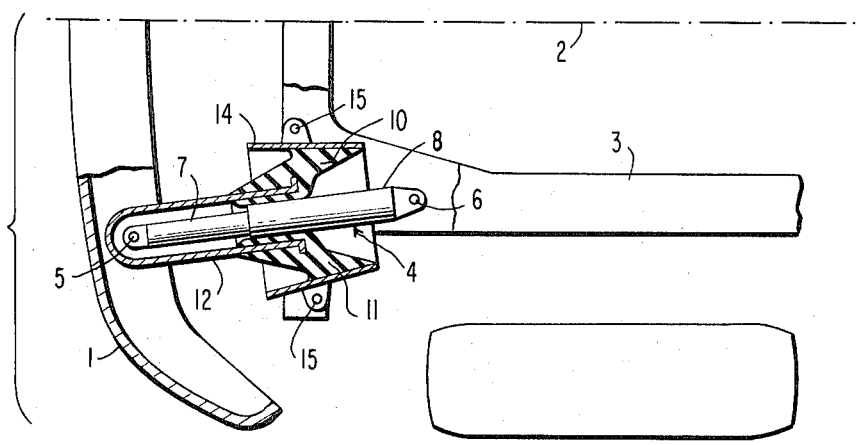
FIG. 2 is a somewhat schematic partial plan view, partially broken away, of a second embodiment of a bumper arrangement in accordance with the present invention.

The embodiment of the present invention illustrated in FIG. 2 corresponds in principle to the embodiment of FIGS. 1 and 3. In lieu of a recess 9 of the support structure 3, a housing 14 shaped in similar manner is provided for the accommodation of the rubber elements 10 and 11. The housing 14 forms together with the shock absorber 4 and the support tube 12 a preassembled structural unit which can be installed as a unit at the support structure 3 and the bumper 1 or disassembled therefrom. Lateral lugs 15 provided with bores are provided at the housing 14 which is open at the forward and rear end thereof, which lugs are adapted to be secured at the support structure 3 by means of bolts or the like. In this embodiment of the present invention, the rubber elements 10 and 11 which also possess a rhombic or diamond-shaped configuration in plan view, abut directly at the cylinder 8 of the shock absorber 4 whereas the support tube 12 is inserted into the rubber elements and possibly is vulcanized within the same.

Figure 4:
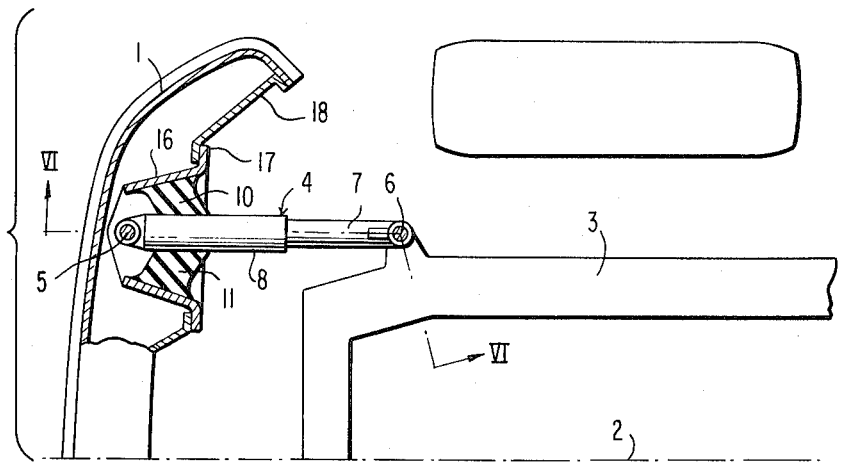
FIGS. 4 and 5 are somewhat schematic, partial plan views, partially broken away, of two further embodiments of a bumper arrangement in accordance with the present invention.
Figure 6:
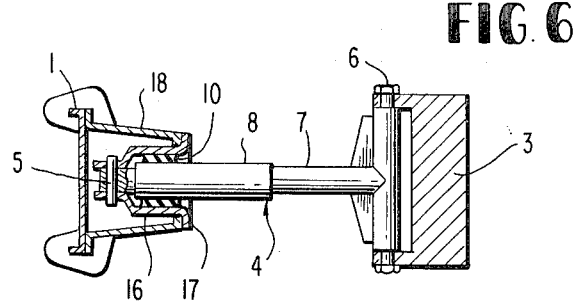
FIG. 6 is a cross-sectional view taken along line VI—VI of FIG. 4.

In the embodiment according to FIGS. 4 and 6, the rubber elements 10 and 11 disposed laterally adjacent the shock absorber 4 are supported at the bumper 1 by way of a housing 16 accommodating the same, whereby the bumper 1 is constructed in this embodiment as hollow profile or sectional member. This arrangement is particularly space-saving since the housing 16 is accommodated on the inside of the already present hollow space of the bumper 1. The housing 16 which is open at the forward and rear end thereof, is threadably connected by means of a flange 17 at the inner profile 18 of the bumper 1. Since the rubber elements 10 and 11 are to engage always at the cylinder 8 of the shock absorbers 4, in this embodiment the cylinder 8 faces the bumper 1. The housing 16 also in this embodiment is constructed as structural unit together with the rubber elements 10 and 11 and the shock absorber 4. Therebeyond the joint 5 of the cylinder 8 of the shock absorber 4 is constituted by the housing 16 as can be seen particularly well from FIG. 6. It is achieved thereby that the bumper 1 itself does not have to accommodate a joint and that it suffices to secure only the flange 17 at the inner part 18 of the bumper 1 constructed as hollow profile. In this embodiment, the rubber elements 10 and 11 produce return forces only in the transverse direction since they are not deformed in case of a movement in the axial direction of the shock absorbers 4. The shock absorbers 4 in this embodiment must therefore contain spring elements which produce the return forces acting in the axial direction to the shock absorbers 4.

Figure 5:
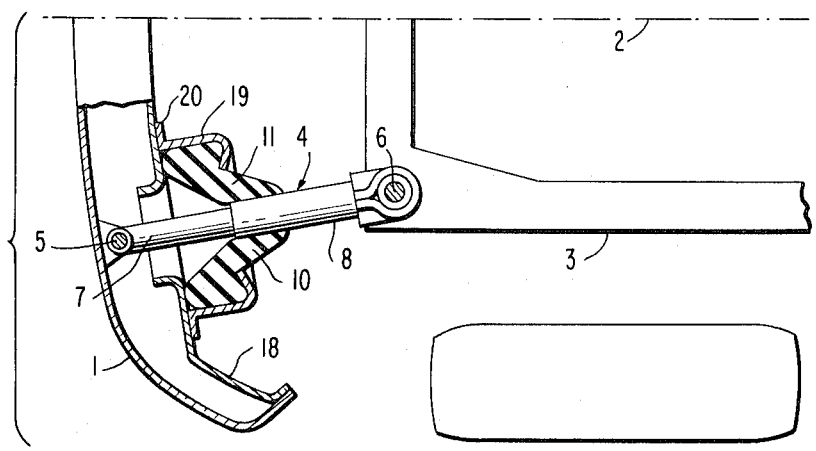

In the embodiment according to FIG. 5, also a housing 19 is provided which accommodates the rubber elements 10 and 11 and which is secured at the bumper 1 constructed as hollow profile. The housing 19 is provided with flanges 20 which are secured at the inwardly disposed part 18 of the hollow profile forming the bumper 1. The shock absorbers 4 are so arranged in this embodiment that the pistons 7 thereof are retained in a joint 5 at the bumper 1 and their cylinders 8 in a joint 6 at the support structure 3. In order to obtain return forces acting also in the axial direction of the shock absorber 4 by means of the rubber elements 10 and 11, the rubber elements 10 and 11 are secured at the cylinder 8 of the shock absorber by vulcanizing, bonding, gluing or the like.

Figure 7:
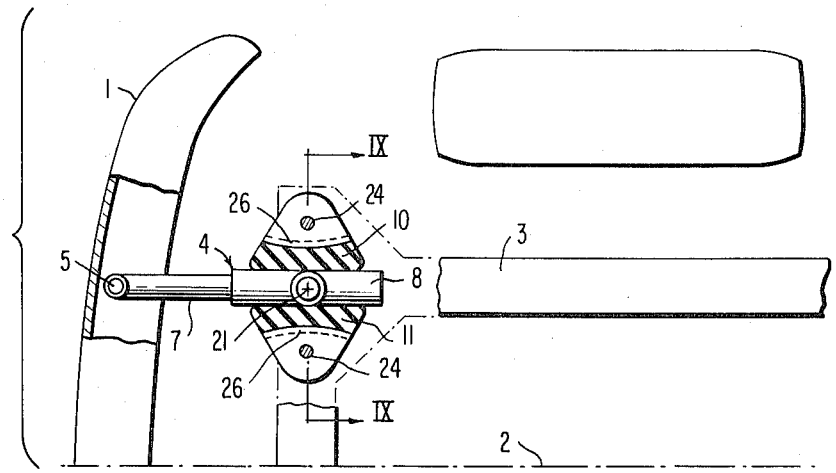
FIGS. 7 and 8 are somewhat schematic partial plan views, partially broken away, of two still further modified embodiments of a bumper arrangement in accordance with the present invention.
Figure 8:
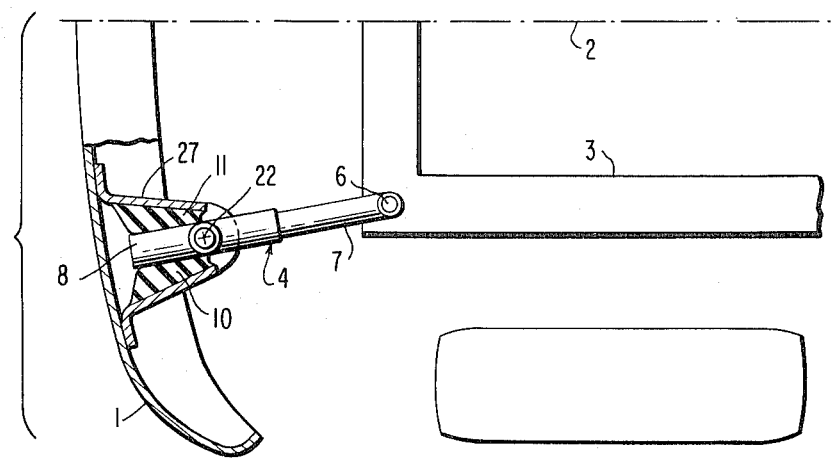
Figure 9:
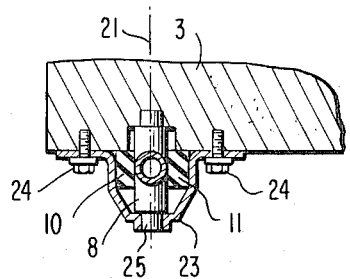
FIG. 9 is a cross-sectional view taken along line IX—IX of FIG. 7.

In the embodiments according to FIGS. 7 to 9, the cylinder 8 of the shock absorbers 4 is not secured at the support structure 3 or bumper 1 at its free end but instead within the area of its center by means of a joint 21 or 22, respectively. In the embodiment according to FIGS. 7 and 9, the rubber-elastic elements 10 and 11 are accommodated in a housing 23 which is secured at the support structure 3 from below by means of bolts 24. The housing 23 forms additionally one-half of the joint 21. The cylinder 8 of the shock absorber 4 is provided with upwardly and downwardly directed cylindrical extensions 25 of which one engages in a guide means of the support structure 3 and the other in a guide means of the housing 23. The side walls 26 of the housing 23, against which abut the rubber elements 10 and 11, are provided with a radius so that their mutual spacing on both sides of the joint 23 becomes larger with respect to the cylinder 8. As a result thereof, the shock absorber 4 receives a sufficient freedom of movement also in the transverse direction.

In the embodiment according to FIG. 8, the cylinder 8 of the shock absorbers 4 again faces the bumper 1. A housing 27 is secured on the inside of the contour of this bumper 1, which receives the rubber elements 10 and 11 disposed on both sides of the cylinder 8 of the shock absorber 4. The joint 22 is constituted in this embodiment again completely by the housing 27 and the cylinder 8 of the shock absorber 4 so that only the housing 27 has to be flangedly connected to the bumper 1. Also in this embodiment a space-saving structural unit is created which can be mounted and assembled in a very simple manner.

While we have shown and described several embodiments in accordance with the present invention, it is understood that the same is not limited thereto but is susceptible of numerous changes and modifications as are known to those skilled in the art, and we therefore do not wish to be limited to the details shown and described herein but intend to cover all such changes and modifications as are encompassed by the scope of the appended claims. What we claim is:

1. An arrangement of a bumper means at a vehicle which is yieldingly supported at a support structure of the vehicle, characterized in that at least two shock absorber means extending in prolongation of lateral parts of the support structure and approximately in the vehicle longitudinal direction are arranged between the bumper means and the support structure, each of said shock absorber means being secured in two spaced joint means having substantially vertical axes each of said shock absorber means being pivotable about respective ones of said vertical axes and being supported in the vehicle transverse direction between elastic body means.

2. An arrangement according to claim 1, characterized in that said elastic body means are rubber elements.

3. An arrangement according to claim 2, characterized in that said rubber elements have approximately parallelogram-like cross-sectional shapes.

4. An arrangement of a bumper means at a vehicle which is yieldingly supported at a support structure of the vehicle, characterized in that at least two shock absorber means extending in prolongation of lateral parts of the support structure and approximately in the vehicle longitudinal direction are arranged between the bumper means and the support structure, said shock absorber means being secured in joint means having substantially vertical axes and being supported in the vehicle transverse direction between elastic body means, and characterized in that the shock absorber means are inserted into recesses of the support structure which are defined by wall portions widening wedge-shaped in the outward direction, the elastic body means abutting at said wall portions.

5. An arrangement according to claim 1, characterized in that the elastic body means are accommodated in housing means surrounding the shock absorber means over at least a part of the length thereof.

6. An arrangement according to claim 5, characterized in that said housing means are secured at the bumper means.

7. An arrangement according to claim 5, characterized in that said housing means are secured at the support structure.

8. An arrangement according to claim 5, characterized in that a housing means together with the elastic body means and a shock absorber means forms a structural unit.

9. An arrangement according to claim 8, characterized in that the structural unit is detachably secured at the bumper means.

10. An arrangement according to claim 8, characterized in that the structural unit is detachably secured at the support structure.

11. An arrangement according to claim 5, characterized in that the housing means is secured at the bumper means whereas the elastic body means surrounded by said housing means engage at a portion of the shock absorber means that is secured at the support structure.

12. An arrangement according to claim 1, characterized in that a respective shock absorber means includes a cylinder and a piston rod, a support tube means being provided which surrounds the piston rod and is guided on the cylinder of the shock absorber means.

13. An arrangement according to claim 12, characterized in that the support tube means is mounted at the bumper means, said support tube means being guided in the elastic body means which are secured at the support structure.

14. An arrangement according to claim 5, characterized in that the housing means forms at least a part of a joint means for the shock absorber means.

15. An arrangement according to claim 14, characterized in that the joint means connecting one of the two parts consisting of bumper means and support structure with the shock absorber means engages approximately centrally at its shock absorber cylinder which is laterally supported by the elastic body means.

16. An arrangement according to claim 15, characterized in that said last-mentioned joint means connects the bumper means with the shock absorber means.

17. An arrangement according to claim 15, characterized in that said last-mentioned joint means connects the support structure with the shock absorber means.

18. An arrangement according to claim 4, characterized in that a respective shock absorber means includes a cylinder and a piston rod, a support tube means being provided which surrounds the piston rod and is guided on the cylinder of the shock absorber means.

19. An arrangement of a bumper means at a vehicle which is yieldingly supported at a support structure of the vehicle, characterized in that at least two shock absorber means extending in prolongation of lateral parts of the support structure and approximately in the vehicle longitudinal direction are arranged between the bumper means and the support structure, said shock absorber means being secured in joint means having substantially vertical axes and being supported in the vehicle transverse direction between elastic body means, and characterized in that a support tube means surrounding a respective shock absorber means is mounted at the bumper means, said support tube means being fixed to the elastic body means which are secured at the support structure.

20. An arrangement according to claim 1, characterized in that the joint means connecting one of the two parts consisting of bumper means and support structure with the shock absorber means engages approximately centrally at its shock absorber cylinder which is laterally supported by the elastic body means.

21. An arrangement for supporting a bumper means at a relatively fixed support structure of a vehicle; said arrangement comprising:
a shock absorber means extending approximately in the longitudinal direction of said fixed support structure,
first joint means for connecting said shock absorber means to said bumper means such that said shock absorber means is pivotable about a first joint vertical axis and is restrained from pivoting about other than said first joint vertical axis at said bumper means,
second joint means for connecting said shock absorber means to said support structure such that said shock absorber means is pivotable about a second joint vertical axis and is restrained from pivoting about other than said second joint vertical axis at said support structure,
said first and second joint means being spaced from one another in the longitudinal direction,
and elastic body means intermediate the ends of said shock absorber means for elastically supporting said shock absorber means in the transverse direction, said elastic body means engaging both oppositely facing transverse sides of said shock absorber means.

22. An arrangement according to claim 21, wherein said shock absorber means are constructed such that the respective portions thereof between the first and second joint means are movable with respect to one another only along the line connecting said joint means.

23. An arrangement according to claim 22, further comprising a second shock absorber means spaced laterally from said first mentioned shock absorber means and connected between said bumper means and said support structure in a similar manner as is said first mentioned shock absorber means.

24. An arrangement according to claim 22, wherein said shock absorber means is inserted into a recess of said support structure which is defined by wall portions widening in the direction toward said bumper means, and wherein the elastic body means abut at said wall portions.

25. An arrangement according to claim 22, wherein a support tube means surrounding said shock absorber means is mounted at the bumper means, and wherein said elastic body means abuttingly engages both said support structure and said support tube means.

26. An arrangement according to claim 25, wherein said support tube means is of polygonal cross-section and includes horizontally disposed sides in sliding guiding engagement with said support structure.

27. An arrangement according to claim 22, wherein said elastic body means are housed in housing means detachably connectible with one of said support structure and said bumper means.

28. An arrangement according to claim 27, wherein said housing means are detachably connectible with said bumper means.

29. An arrangement according to claim 27, wherein said housing means are detachably connectible with said support structure.

30. An arrangement according to claim 27, wherein said elastic body means is fixed to an inside wall surface of said housing means and to an outer wall portion of a cylinder of said shock absorber means.

31. An arrangement according to claim 22, wherein one of said first and second joint means is positioned intermediate the ends of the shock absorber means, and wherein said elastic body means engages said shock absorber means at positions spaced outwardly of said one of said first and second joint means in a direction opposite the other of said first and second joint means.

* * * * *